United States Patent
Giordano et al.

(10) Patent No.: US 11,293,281 B2
(45) Date of Patent: Apr. 5, 2022

(54) COMBINED WIRELINE AND WIRELESS APPARATUS AND RELATED METHODS

(71) Applicant: Schlumberger Technology Corporation, Sugar Land, TX (US)

(72) Inventors: Palma Giordano, Houston, TX (US); Stephane Vannuffelen, Cambridge, MA (US); Arnaud Croux, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 159 days.

(21) Appl. No.: 16/471,436

(22) PCT Filed: Dec. 19, 2016

(86) PCT No.: PCT/US2016/067414
§ 371 (c)(1),
(2) Date: Jun. 19, 2019

(87) PCT Pub. No.: WO2018/117999
PCT Pub. Date: Jun. 28, 2018

(65) Prior Publication Data
US 2021/0131277 A1    May 6, 2021

(51) Int. Cl.
*E21B 47/16*    (2006.01)
*E21B 47/06*    (2012.01)
(Continued)

(52) U.S. Cl.
CPC .............. *E21B 47/16* (2013.01); *E21B 23/14* (2013.01); *E21B 47/06* (2013.01); *G01L 13/00* (2013.01)

(58) Field of Classification Search
CPC ........ E21B 47/06; E21B 47/107; E21B 47/16; E21B 47/18; G01L 13/00
See application file for complete search history.

(56) References Cited

U.S. PATENT DOCUMENTS 5,914,911 A * 6/1999 Babour ................... E21B 47/16
367/82
6,912,177 B2 * 6/2005 Smith ..................... E21B 47/16
367/82
(Continued)

FOREIGN PATENT DOCUMENTS

CA    2820830 A1 *    6/2012    ............ E21B 47/13
EP    0773345 A1    5/1997
(Continued)

OTHER PUBLICATIONS

International Preliminary report on patentability issued in the related PCT Application PCT/US2016/067414, dated Jul. 4, 2019 (12 pages).
(Continued)

*Primary Examiner* — Jennifer H Gay
(74) *Attorney, Agent, or Firm* — Rodney Warfford

(57) ABSTRACT

Combined wireline and wireless apparatus and related methods are disclosed herein. An example apparatus includes a tool string including a tool bus and a first acoustic repeater coupled to the tool string. The first acoustic repeater is to communicate with a second acoustic repeater to exchange data. The second acoustic repeater is communicatively coupled to a first tool. The first tool is not communicatively coupled to the tool bus.

22 Claims, 7 Drawing Sheets

(51) Int. Cl.
*G01L 13/00* (2006.01)
*E21B 23/14* (2006.01)

(56) References Cited

U.S. PATENT DOCUMENTS

| | | | | |
|---|---|---|---|---|
| 8,605,548 | B2* | 12/2013 | Froelich | E21B 47/16 367/82 |
| 8,750,075 | B2* | 6/2014 | Rayssiguier | E21B 47/14 367/82 |
| 8,994,550 | B2* | 3/2015 | Millot | E21B 47/13 340/854.4 |
| 9,284,834 | B2* | 3/2016 | Alteirac | E21B 47/12 |
| 9,404,333 | B2* | 8/2016 | Patel | E21B 34/06 |
| 9,638,029 | B2* | 5/2017 | Merino | E21B 43/00 |
| 9,670,773 | B2* | 6/2017 | Croux | H04B 11/00 |
| 9,686,021 | B2* | 6/2017 | Merino | H04B 11/00 |
| 9,715,031 | B2* | 7/2017 | Contant | G01V 3/30 |
| 9,790,786 | B2* | 10/2017 | Croux | H04B 11/00 |
| 10,036,244 | B2* | 7/2018 | Rayssiguier | E21B 47/017 |
| 10,180,044 | B2* | 1/2019 | Vasques | E21B 47/12 |
| 10,337,321 | B1* | 7/2019 | Sarac | E21B 47/14 |
| 10,590,759 | B2* | 3/2020 | Ertas | E21B 47/06 |
| 10,655,456 | B2* | 5/2020 | Espe | E21B 47/07 |
| 10,711,601 | B2* | 7/2020 | Sarac | E21B 47/14 |
| 10,900,352 | B2* | 1/2021 | Vannuffelen | G10K 11/002 |
| 2003/0072218 | A1* | 4/2003 | Smith | G08C 23/02 367/83 |
| 2005/0284659 | A1* | 12/2005 | Hall | H04L 67/02 175/27 |
| 2006/0244628 | A1* | 11/2006 | Bausov | G01V 11/002 340/854.8 |
| 2009/0045974 | A1* | 2/2009 | Patel | G01V 11/002 340/854.6 |
| 2009/0115624 | A1* | 5/2009 | Tinnen | E21B 47/18 340/853.6 |
| 2010/0165788 | A1* | 7/2010 | Rayssiguier | E21B 47/16 367/25 |
| 2011/0149687 | A1* | 6/2011 | Rayssiguier | E21B 47/16 367/82 |
| 2011/0176387 | A1* | 7/2011 | Froelich | E21B 47/16 367/82 |
| 2011/0205080 | A1* | 8/2011 | Millot | E21B 47/16 340/854.4 |
| 2011/0205847 | A1* | 8/2011 | Lemenager | E21B 47/13 367/82 |
| 2012/0043069 | A1* | 2/2012 | Maranuk | E21B 47/12 166/66 |
| 2012/0249338 | A1* | 10/2012 | Merino | E21B 47/16 340/854.6 |
| 2012/0250461 | A1* | 10/2012 | Millot | H04B 11/00 367/82 |
| 2012/0286967 | A1* | 11/2012 | Alteirac | E21B 47/12 340/853.7 |
| 2013/0241742 | A1* | 9/2013 | Contant | G01V 3/30 340/854.6 |
| 2013/0257629 | A1* | 10/2013 | Hallundbæk | E21B 47/14 340/854.6 |
| 2014/0286130 | A1* | 9/2014 | Rayssiguier | E21B 47/14 367/81 |
| 2015/0204155 | A1 | 7/2015 | Patel | |
| 2015/0285063 | A1 | 10/2015 | Purkis | |
| 2015/0292320 | A1 | 10/2015 | Lynk et al. | |
| 2016/0010447 | A1* | 1/2016 | Merino | E21B 34/06 340/854.6 |
| 2016/0047236 | A1* | 2/2016 | Croux | H04B 11/00 367/82 |
| 2016/0115782 | A1* | 4/2016 | Martinez | E21B 47/12 340/853.3 |
| 2016/0258285 | A9* | 9/2016 | Croux | H04B 11/00 |
| 2016/0356152 | A1* | 12/2016 | Croux | H04W 40/12 |
| 2017/0254183 | A1* | 9/2017 | Vasques | E21B 41/0085 |
| 2018/0010446 | A1* | 1/2018 | Roberson | E21B 47/26 |
| 2018/0179886 | A1* | 6/2018 | Espe | E21B 47/002 |
| 2019/0112913 | A1* | 4/2019 | Song | E21B 47/16 |
| 2019/0153857 | A1* | 5/2019 | Yi | E21B 47/16 |
| 2019/0186260 | A1* | 6/2019 | Sarac | E21B 47/14 |
| 2020/0088027 | A1* | 3/2020 | Vannuffelen | G10K 11/004 |
| 2020/0123894 | A1* | 4/2020 | Ross | E21B 43/11 |
| 2020/0300083 | A1* | 9/2020 | Fellinghaug | E21B 47/14 |

FOREIGN PATENT DOCUMENTS

| | | | | |
|---|---|---|---|---|
| EP | 2990593 | A1 | 3/2016 | |
| EP | 3101224 | A1 | 7/2016 | |
| WO | WO-2009029067 | A1 * | 3/2009 | E21B 47/12 |
| WO | 2011082122 | A1 | 7/2011 | |
| WO | WO-2012042499 | A2 * | 4/2012 | E21B 47/13 |
| WO | 2014046670 | A1 | 3/2014 | |
| WO | WO-2014120988 | A1 * | 8/2014 | E21B 47/16 |
| WO | WO-2016153466 | A1 * | 9/2016 | H04B 7/155 |
| WO | WO-2018122548 | A1 * | 7/2018 | E21B 47/18 |

OTHER PUBLICATIONS

The Partial Supplementary European Search Report issued in the EP application 16924788.9, dated Jul. 3, 2020 (12 pages).

International Search report and Written Opinion issued in the related PCT Application PCT/US2016/067414, dated Aug. 31, 2017 (13 pages).

The Extended European Search Report issued in the EP application 16924788.9, dated Nov. 20, 2020 (13 pages).

* cited by examiner

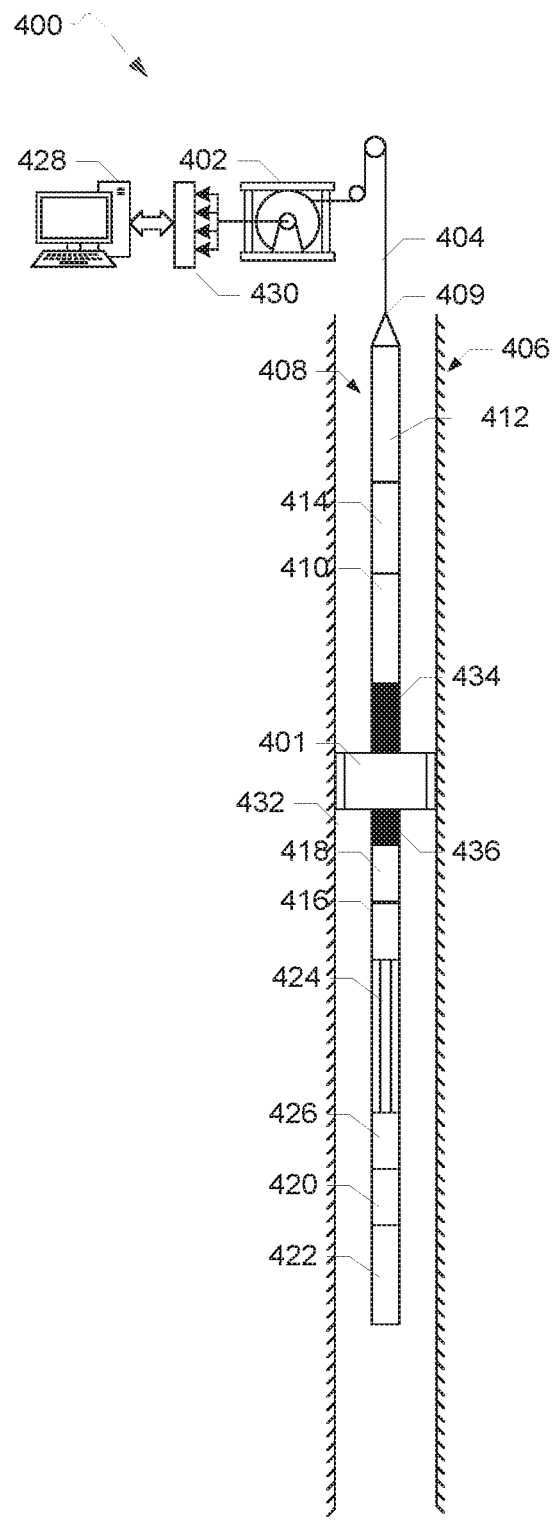 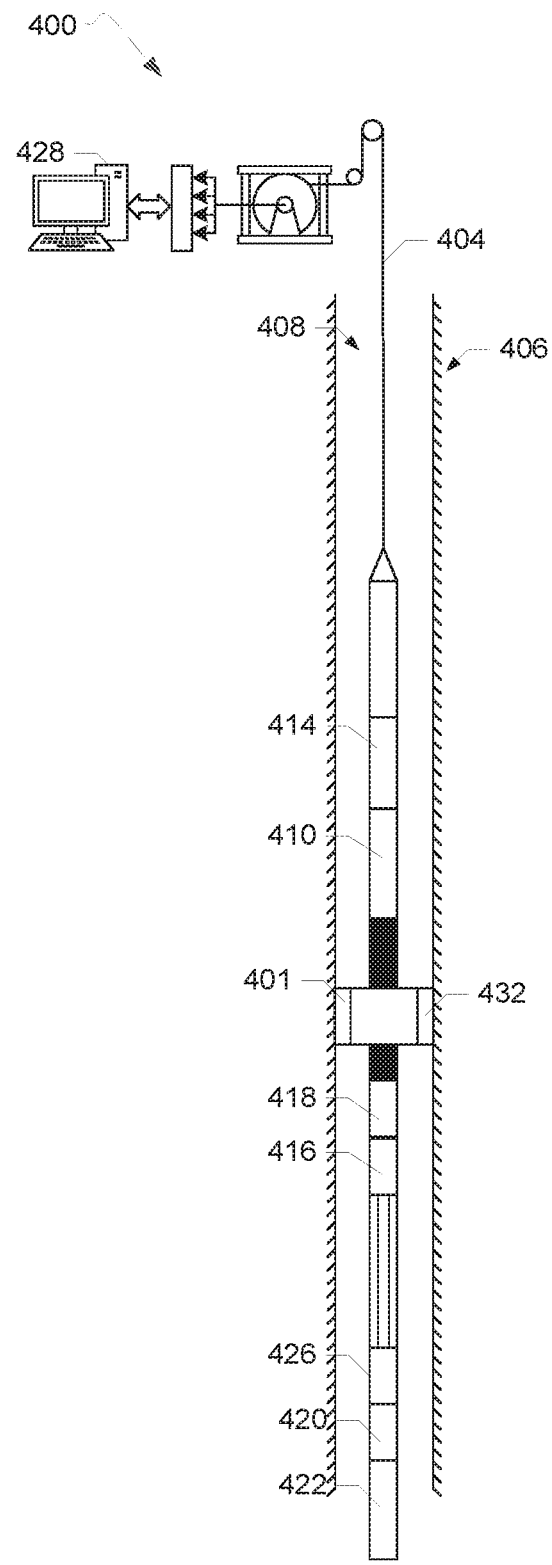
FIG. 4A
FIG. 4B

COMBINED WIRELINE AND WIRELESS APPARATUS AND RELATED METHODS

BACKGROUND

This disclosure relates generally to wireline and wireless downhole technology and, more particularly, to combined wireline and wireless apparatus and related methods.

DESCRIPTION OF THE RELATED ART

Wireline technology includes the use of an electrical cable to convey equipment downhole in a wellbore and to control the equipment via instructions received from the surface. The equipment is mechanically and/or electrically coupled via a tool string that is coupled to the electrical cable via a cablehead. The tool string includes a telemetry cartridge that enables communication between the downhole equipment and the surface as well as communication between the various pieces of equipment (e.g., via a communication bus).

Downhole obstructions in the wellbore such as plugs or production valves and/or deviations in the wellbore can limit a depth to which wireline technology can be used to deploy equipment downhole. Wireless technology enables communication across obstructions such as packers or plugs. Example downhole wireless technology includes an acoustic telemetry system in which a series of repeater nodes receive and send acoustic signals containing messages along the tool string to transmit the signals and, thus, the messages included therein, to a surface node for controlling and monitoring downhole equipment via software and hardware at the surface.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example apparatus includes a tool string including a tool bus and a first acoustic repeater mechanically coupled to the tool string. The first acoustic repeater is to communicate with a second acoustic repeater to exchange data. The second acoustic repeater is communicatively coupled to a first tool. The first tool is not communicatively coupled to the tool bus.

An example method includes deploying, by executing an instruction with a processor, a tool string in a wellbore. The tool string includes a first acoustic repeater. The example method includes communicating, by executing an instruction with the processor and via the first acoustic repeater, with a second acoustic repeater. The second acoustic repeater is associated with a first tool disposed in the wellbore. The second acoustic repeater is to transmit first data to the first acoustic repeater. The example method includes transmitting, by executing an instruction with the processor, the first data from the first acoustic repeater to the processor.

An example apparatus includes a tool string including a first tool and a first acoustic repeater mechanically coupled to the tool string. The first acoustic repeater is to exchange first data with a second acoustic repeater. The second acoustic repeater is associated with a second tool. The example apparatus includes means for transmitting the first data between the first acoustic repeater and a processor and means for transmitting second data between the first tool and the processor.

An example method includes disposing a pressure gauge in a wellbore. The pressure gauge is to be coupled to a first acoustic repeater. The example method includes setting a pressure barrier in the wellbore via a tool string. The pressure gauge is to be disposed below the pressure barrier relative to a surface. The tool string includes a second acoustic repeater mechanically coupled to the tool string. The example method includes accessing, by executing an instruction with a processor and via the second acoustic repeater, first pressure data collected by the pressure gauge. The first pressure data is to be transmitted to the second acoustic repeater via the first acoustic repeater. The example method includes increasing, by executing an instruction with the processor, a pressure in wellbore. The example method includes accessing, by executing an instruction with the processor and via the second acoustic repeater, second pressure data collected by the pressure gauge after the increasing of the pressure in the wellbore. The example method includes performing, by executing an instruction with the processor, a comparison of the first pressure data and the second pressure data. The example method includes one of unsetting the tool string from the pressure barrier or adjusting the setting of the pressure barrier via the tool string based on the comparison.

Various refinements of the features noted above may exist in relation to various aspects of the present embodiments. Further features may also be incorporated in these various aspects. These refinements and additional features may exist individually or in any combination. For instance, various features discussed below in relation to the illustrated embodiments may be incorporated into any of the above-described aspects of the present disclosure alone or in any combination. Again, the brief summary presented above is intended to familiarize the reader with certain aspects and contexts of some embodiments without limitation to the claimed subject matter.

BRIEF DESCRIPTION OF THE DRAWINGS

FIGS. 4A and 4B illustrates a third example combined wireline and wireless system in accordance with the teachings disclosed herein for setting an example plug in a downhole environment and monitoring one or more conditions below the plug.

The figures are not to scale. Wherever possible, the same reference numbers will be used throughout the drawing(s) and accompanying written description to refer to the same or like parts.

DETAILED DESCRIPTION

Figure 1:
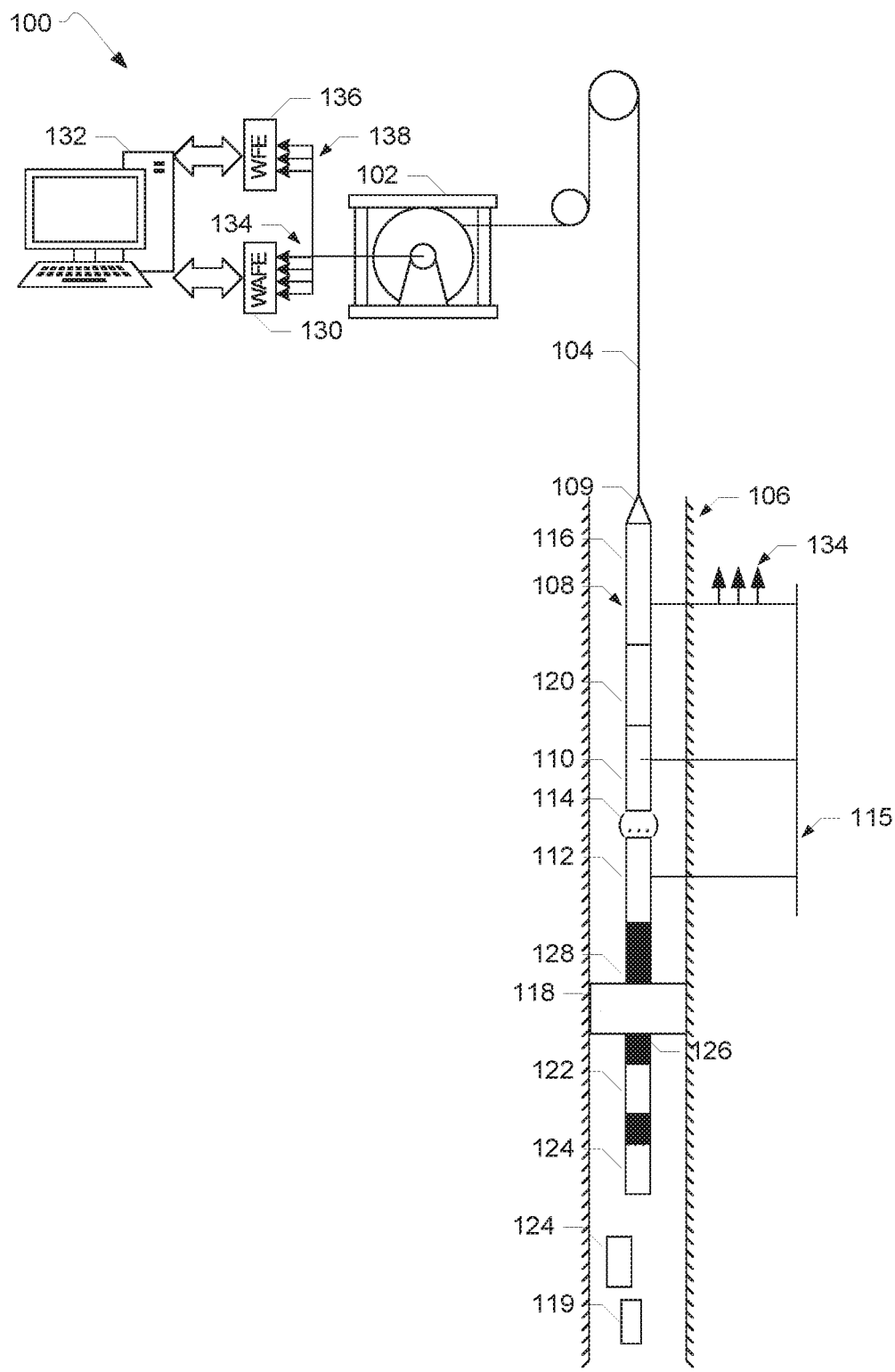
FIG. 1 illustrates a first example combined wireline and wireless system in accordance with the teachings disclosed herein.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of any of the terms "top," "bottom," "above," "below," other directional terms, and variations of these terms is made for convenience, but does not mandate any particular orientation of the components.

Wireline technology is used to deliver and set equipment downhole in a wellbore for activities such as well formation evaluation or production. Wireline technology can also be used to provide intervention services such as, for example, to open or close a downhole valve or adjust a plug position. A wireline tool string includes one or more tools mechanically and/or electrically coupled to the string. The wireline tool string is deployed downhole via an electrical cable. The wireline tool string can include a telemetry cartridge to provide for bidirectional telemetry between a surface computer (e.g., via electrical lines of the cable) and the tools of the wireline tool string (e.g., via a communication bus to which the tools are coupled).

Although wireline systems can provide for efficient delivery of equipment downhole to the wellbore, there are limitations with respect to downhole depths that can be reached by a cable and a tool string of a wireline system. Obstructions in the wellbore such as plugs or production valves can limit the depth to which the wireline system can be used for equipment delivery and/or communication purposes. For example, pressure barriers such as packers or plugs typically do not provide for wires to pass therethrough so as to not compromise the function of the pressure barriers. As a result, the cable and the tool string of the wireline system cannot reach below the obstruction(s).

Wireless telemetry can be used in examples where deploying the wireline cable and string is not feasible by providing for communication across obstructions such as pressure barriers. Wireless telemetry can be used to provide for operational control of and communication with equipment located below the obstructions. Examples of wireless telemetry include acoustic telemetry or electromagnetic telemetry.

An example acoustic telemetry system includes two or more acoustic repeater nodes that send and receive messages in the form of acoustic signals across a wireless network formed by the repeaters, or a network that does not use a cable (e.g., a wireline cable) as a communication medium. Some of the acoustic repeater nodes are end repeater nodes that interface with downhole tools (e.g., valves) or sensors such as pressure gauges. A surface repeater node can be coupled to a surface computer (e.g., via a wired connection) to provide for communication between the surface and the downhole tools interfaced with the end repeater nodes. Production pipe, drill pipe, wellbore casing, and/or borehole fluid can be used as transmission media for propagating the acoustic signals across the wireless repeater network.

As disclosed above, wireline technology can be used to provide intervention services. Downhole equipment such as packers, mechanical plugs, valves, and/or sleeves can be set using a wireline system that performs one or more operations to mechanically shift the equipment (e.g., opening, closing, or altering the position of the equipment) to set the equipment in a desired state. As also disclosed above, once a downhole tool such as a packer or plug is set, communication with tools located below the packer or the plug via the wireline system may no longer be feasible. Rather, the packer or the plug serves as an obstruction to wireline-based communication between the surface and tools disposed below the obstruction. Wireless telemetry provides for communication at downhole depths that cannot be reached by the wireline tool string. However, wirelessly monitoring conditions below an obstruction involves introducing a string including a wireless repeater into the wellbore after the obstruction (e.g., the plug) has been set by the wireline system to establish communication with wireless-enabled tools disposed below the obstruction. Thus, multiple runs of tools strings into the wellbore are required with respect to using wireline and wireless technology downhole.

Example apparatus, systems, and methods disclosed herein combine wireline technology and wireless acoustic technology in a wireline-wireless hybrid tool string. The example combined wireline and wireless tool string can be used to deliver and set downhole tools via wireline while providing for wireless communication and monitoring of conditions and/or equipment disposed below an obstruction in the wellbore via transmission of acoustic signals across an acoustic repeater network. Examples disclosed herein provide for efficient workflows via the combined wireline and wireless tool string that enables, for example, setting an obstructing tool such as a plug via wireline and wirelessly monitoring pressure conditions below the plug after setting the plug or other obstruction. Therefore, setting the tool and communicating with equipment below the tool can be accomplished via one downhole run of the combined wireline and wireless string disclosed herein.

In examples disclosed herein, one or more acoustic repeaters are mechanically coupled to a wireline tool string. The wireline tool string including the acoustic repeater(s) is conveyed downhole via a wireline cable. In examples disclosed herein, the electrical lines of the wireline cable provide for telemetric communication between the surface, the wireline tool string, and the acoustic repeater(s) integrated in the wireline tool string. The acoustic repeater(s) integrated in the wireline tool string communicate with one or more wireless-enabled downhole tools disposed below an obstruction such as a plug. Examples disclosed herein provide for simultaneous or sequential operation of the tools of the wireline tool string, the acoustic repeater(s), and/or the tool(s) disposed below the obstruction. Examples disclosed herein enable communication with devices beyond the reach of the wireline tool string via selective operation of the wireline and wireless systems deployed in one downhole run. Although the examples disclosed herein are discussed in the context of communication between a tool disposed in a wellbore and the surface, the examples disclosed herein can be implemented in other environments in which wired communication between a device (e.g., an electro-mechanical device) and a controlling device (e.g., a computer) is obstructed.

FIG. 1 illustrates a first example combined wireline and wireless system 100. The first example system 100 includes a winch 102 disposed at a surface for deploying an electrical cable 104 downhole in a wellbore 106. The cable 104 is coupled to a wireline tool string 108 via a cablehead 109. In some examples, the cable 104 is a digital slickline.

The wireline tool string 108 includes a first tool 110, a second tool 112, and n tools 114 disposed between the first tool 110 and the second tool 112. The tools 110, 112, 114 are mechanically coupled to the wireline tool string 108 via, for example, threaded connections. The tools 110, 112, 114 are electrically coupled via a wireline tool bus 115. The wireline tool string 108 also includes a wireline telemetry cartridge 116 to provide communication between the downhole tools 110, 112, 114 and the surface via the bus 115 and the cable 104. In some examples, the wireline telemetry cartridge 116 includes an electrical power source for the tools 110, 112, 114.

As illustrated in FIG. 1, the wireline tool string 108 is disposed in the wellbore 106 above an obstruction 118 in the wellbore 106. The obstruction 118 can be, for example, a plug or packer disposed in the wellbore 106. The obstruction 118 can also be caused by a deviation in the wellbore 106. As also illustrated in FIG. 1, a tool 119 is disposed below the obstruction 118. The wellbore 106 can include additional tools disposed below the obstruction 118.

As disclosed above, the wireline tool string 108 disposed above the obstruction 118 is unable to communicate with the tool 119 disposed below the obstruction 118 due to, for example, the inability of an electrical line of the cable 104 to pass through the obstruction 118. Thus, the tool 119 is not communicatively coupled to the surface via the bus 115 of the wireline tool string 108, the wireline telemetry cartridge 116, and the cable 104 as are the tools 110, 112, 114 of the wireline tool string 108.

To provide for communication between the tool 119 and the surface, the wireline tool string 108 of FIG. 1 includes a first acoustic repeater 120 integrated or embedded in the wireline tool string 108. The first acoustic repeater 120 is mechanically coupled to the wireline tool string 108 via, for example, a threaded connection. As a result of the integration of the first acoustic repeater 120 in the wireline tool string 108, the wireline tool string 108 and the first acoustic repeater 120 are conveyed downhole via one run of the cable 104.

The first acoustic repeater 120 includes an acoustic transducer (e.g., a linear actuator) for receiving and transmitting acoustic signals. For example, the transducer can be a piezoelectric actuator that expands or retracts in response to electrical excitation. The first acoustic repeater 120 can include a backing mass coupled to the transducer to tune a resonance frequency of the transducer and/or adjust the resonance frequency to be within a predefined frequency range. The first acoustic repeater can include electronics such as microcontroller for modulating signals, an amplifier, and/or other components for processing signals for transmission via a transmission medium to which the first acoustic repeater 120 is coupled. In the example of FIG. 1, the transmission medium can include the wireline tool string 108 and/or other propagation media (e.g., metal conductors, borehole fluid), as disclosed below.

The first acoustic repeater 120 can perform one or more signal processing techniques with respect to the acoustic signals received by or transmitted by the first acoustic repeater 120. For example, the electronics of the first acoustic repeater 120 can perform signal equalization, phase modulation, amplitude modulation, etc. Signals transmitted by first acoustic repeater 120 are propagated to, for example, another acoustic repeater, via the transmission medium.

In the example system 100, the first acoustic repeater 120 is in communication with one or more other acoustic repeaters disposed in the wellbore 106 below the obstruction 118 (e.g., other acoustic repeaters substantially similar to the first acoustic repeater described above). For example, a second acoustic repeater 122 is disposed below the obstruction 118. Also, one or more end acoustic repeater nodes 124 are also disposed below the obstruction 118. The end acoustic repeater node(s) 124 interface with or are communicatively coupled to the tool 119 such that the tool 119 is a wireless-enabled tool. In some examples, one of the end acoustic repeater nodes 124 is mechanically coupled to the tool 119. Put another way, communication can be established with the tool 119 without the use of a wireline cable. The end acoustic repeater node(s) 124 can interface with other tools disposed in the wellbore 106 below the obstruction 118. The acoustic repeaters 122, 124 can be coupled (e.g., clamped) to production tubing in the wellbore 106. In other examples, one or more of the acoustic repeaters 122, 124 are coupled to a string of, for example, metal rods disposed below the obstruction 118 The example system 100 can include additional or fewer acoustic repeaters 120, 122, 124 than illustrated in FIG. 1, including stand-alone repeaters (e.g., the second wireless repeater 122) or repeaters interfaced with downhole tools (e.g., the end wireless repeater node(s) 124). In some examples, the second repeater 122, the end repeater node(s) 124, and one or more other repeaters form a network. As disclosed below, in some such examples, the first acoustic repeater 120 embedded in the wireline tool string servers as an entry point from the surface to the wireless network formed below the obstruction 118.

In some examples, each of the acoustic repeaters 120, 122, 124 includes a respective power source such as a battery. In such examples, although the first acoustic repeater 120 is mechanically coupled to the wireline tool string 108, the first acoustic repeater 120 operates using a different power supply than the tools 110, 112, 114 of the wireline tool string 108. In other examples, the tools 110, 112, 114 of the wireline tool string 108 and the first acoustic repeater 120 share one or more power sources such as electrical power provided via the wireline telemetry cartridge 116.

The acoustic repeaters 120, 122, 124 of the example system 100 form a wireless network. Acoustic signals generated below the obstruction 118 including data associated with the wireless-enabled tool 119 are transmitted between the end acoustic repeater node(s) 124 and the second acoustic repeater 122. The second acoustic repeater 122 transmits the acoustic signals to the first acoustic repeater 120 embedded in the wireline tool string 108, thereby providing for communication above and below the obstruction 118. The signals received by the first wireless repeater 120 are transmitted to the surface via the cable 104 for processing. Thus, the first acoustic repeater 120 is a master node in communication with the surface and the wireless repeaters 122, 124 in the wellbore 106 to transmit data from the tool 119 disposed below the obstruction 118 to the surface. The first acoustic repeater 120 serves as an entry point or gateway for communication with the acoustic repeaters 122, 124 disposed below the obstruction 118.

Similarly, acoustic signals containing messages such as commands for the wireless-enabled tool 119 can be transmitted from the surface to the wireless-enabled tool 119 disposed below the obstruction 118 via the wireless network of the repeaters 120, 122, 124. For example, the first acoustic repeater 120 can receive a signal including a message from the surface via the cable 104. The first acoustic repeater 120 transmits the signal to the wireless-enabled tool 119 via the acoustic repeaters 122, 124. Therefore, network of the first acoustic repeater 120, the second acoustic repeater 122, and the end acoustic repeater nodes 124 provides for wireless communication between wireless-enabled tool 119 disposed below the obstruction 118 and the surface.

The example system 100 includes a first propagator 126 disposed below the obstruction 118 between the second wireless repeater 122 and the obstruction 118 and a second propagator 128 disposed above the obstruction 118 between the first acoustic repeater 120 and the obstruction 118. The first and second propagators 126, 128 serve as acoustic propagation media to help transmit the acoustic signals containing messages being sent to and/or generated by the wireless-enabled tool 119 across the obstruction 118. In some examples, the first and second propagators 126, 128 are mechanically coupled to the obstruction 118. The first and/or second propagators 126, 128 can be, for example, sections of production piping or solid metal rods. In other examples, borehole fluid serves as the acoustic propagation medium.

In the example system 100, the cable 104 includes two or more electrical lines, which serve as independent paths for data transmission between the surface, the tools 110, 112, 114 of the wireline tool string 108, and the wireless network formed by the acoustic repeaters 120, 122, 124. The example system 100 includes a wireline acquisition front-end ("WAFE") 130 that provides for bidirectional communication between a computer 132 at the surface and the tools 110, 112, 114 of the wireline tool string 108 via a first set of electrical lines 134 of the cable 104. The WAFE 130 can also transmit power to the wireline tools 110, 112, 114 via the first set of electrical lines 134 of the cable 104. The computer 132 includes software to generate instructions to monitor and control the tools 110, 112, 114 of the wireline tool string 108 via the WAFE 130. The first set of electrical lines 134 can be coupled to the bus 115 for transmission of data between the wireline tools 110, 112, 114 and the surface.

The example system 100 also includes a wireless acquisition front-end ("WFE") 136 that provides for bidirectional communication between the computer 132 and the first acoustic repeater 120 of the wireline tool string 108 via a second set of electrical lines 138 of the cable 104. The first acoustic repeater 120 transmits the data received via the WFE 136 to the acoustic repeaters 122, 124 for delivery to the tool 119 disposed below the obstruction 118. In the example system 100, when the first acoustic repeater 120 receives an acoustic signal that has been transmitted by the acoustic repeaters 122, 124, the signal is transmitted to the WFE 136 via the second set of electrical lines 138 of the cable 104 (e.g., via a wired connection). The computer 132 includes software to generate instructions to monitor and control the tool 119 via the WFE 136 based on, for example, an analysis of data from the tool 119 contained in the signal transmitted across the wireless network. In the example system 100, the software installed on the computer 132 to communicate with the WFE 136 is different than the software installed on the computer 132 to communicate with the WAFE 130.

Thus, in the example system 100, the electrical lines of the cable 104 are spilt into the first set of electrical lines 134 to control the tools 110, 112, 114 of the wireline tool string 108 via the WAFE 130 and the second set of electrical lines 138 to control the wireless-enabled tool 119 disposed below the obstruction 118 via the WFE 136. The WAFE 130 and the WFE 136 provide for independent operation of the tools 110, 112, 114 of the wireline tool string 108 and the first acoustic repeater 120, respectively, via inputs received from the computer 132 for transmission via the respective front-end interfaces, the WAFE 130 and the WFE 136. In some examples, the WAFE 130 delivers instructions for operation of one or more of the tools 110, 112, 114 of the wireline tool string 108 at substantially the same time the first acoustic repeater 120 receives messages from the WFE 136 for delivery to the tool 119 via the wireless repeater network. In other examples, the transmission of data between the WAFE 130 and the tools 110, 112, 114 of the wireline tool string 108 is sequential relative to the transmission of data between the WFE 136, the acoustic repeaters 120, 122, 124, and the tool 119.

In some examples, one or more of the tools 110, 112, 114 of the wireline tool string 108 and tool 119 disposed below the obstruction 118 are operated sequentially based on instructions received via the WAFE 130 and the WFE 136. For example, a first instruction can be transmitted via the WAFE 130, the first set of electrical lines 134, and the bus 115 instructing the first tool 110 of the wireline tool string 108 to perform a first action at a first time. A second instruction can be transmitted via the WFE 136, the second set of electrical lines 138, and the acoustic repeaters 120, 122, 124 instructing the tool 119 disposed below the obstruction 118 to perform a second action at a second time. In other examples, instructions transmitted downhole via the WAFE 130 and the WFE 136 direct the first tool 110 of the wireline tool string 108 and the tool 119 disposed below the obstruction 118 to operate substantially simultaneously.

In some examples, the first acoustic repeater 120 is coupled to the wireline tool string 108 at a position along the wireline tool string 108 that is closer in proximity to the surface than an end of the wireline tool string 108 that is proximate to the obstruction 118. For example, as illustrated in FIG. 1, the first acoustic repeater 120 can be coupled to the wireline tool string 108 proximate to the wireline telemetry cartridge 116. Such a positioning of the first acoustic repeater 120 as illustrated in FIG. 1 substantially reduces the need to provide for wiring dedicated to communication with the first acoustic repeater 120 (e.g., the second set of electrical lines 138) along the remainder of wireline tool string 108 as compared to the first acoustic repeater 120 being located elsewhere along the wireline tool string 108 (e.g., proximate to the obstruction 118).

In the example system 100, the first acoustic repeater 120 and the wireline tool string 108 share the cable 104 to communicate with the surface. As disclosed above, the electrical lines of the cable 104 are split into the first set of electrical lines 134 and the second set of electrical lines 138 for communication via the WAFE 130 and the WFE 136, respectively. In other examples, the wireline tool string 108 and the first acoustic repeater 120 integrated therein are controlled via a single front-end surface interface. A single front-end surface interface may be used if, for example, the cable 104 is a monocable.

Figure 2:
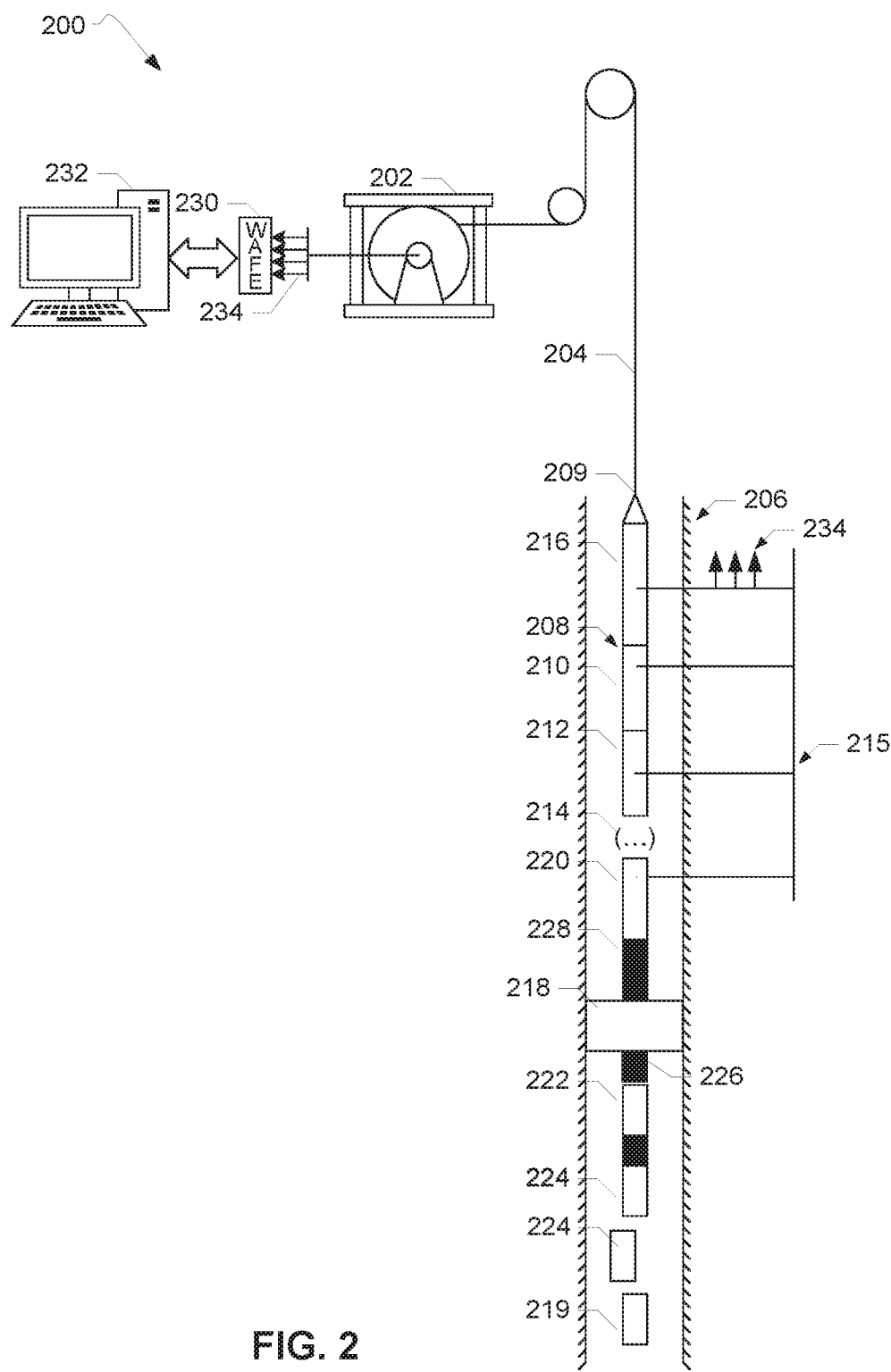
FIG. 2 illustrates a second example combined wireline and wireless system in accordance with the teachings disclosed herein.

FIG. 2 illustrates a second example combined wireline and wireless system 200 in accordance with the teachings disclosed herein. The second example system 200 includes a winch 202 disposed at a surface for deploying an electrical cable 204 downhole in a wellbore 206. In some examples, the cable 204 is a monocable. The cable 204 is coupled to a wireline tool string 208 via a cablehead 209. In some examples, the cable 204 is a digital slickline.

The wireline tool string 208 includes a first tool 210, a second tool 212, and n tools 214 mechanically coupled to the wireline tool string 208. The tools 210, 212, 214 are electrically coupled via a wireline tool bus 215. The wireline tool string 208 also includes a wireline telemetry cartridge 216 to provide communication between the downhole tools 210, 212, 214 and the surface via the bus 215 and the cable 204. In some examples, the wireline telemetry cartridge 216 includes an electrical power source for the tools 210, 212, 214.

As illustrated in FIG. 2, the wellbore 206 includes an obstruction 218. The obstruction 218 can be a packer or a plug disposed in the wellbore 206 or a deviation in the wellbore 206. As also illustrated in FIG. 2, a tool 219 is disposed below the obstruction 218. The wellbore 206 can include additional tools disposed below the obstruction 218. The wireline tool string 208 of FIG. 2 is disposed in the wellbore 206 above the obstruction 218 in the wellbore 206. Thus, because the wireline tool string 208 does not extend below the obstruction 218, the wireline tool string 208 is unable to communicate with the tool 219 disposed below the obstruction 218. Put another way, the tool 219 is not communicatively coupled to the wireline tool string 208 (e.g., via the bus 215).

The wireline tool string 208 includes a first acoustic repeater 220 mechanically coupled to the wireline tool string 208. Thus, the wireline tool string 208 and the first acoustic repeater 220 integrated therein are conveyed downhole via one run of the cable 204. Also, in the example combined wireline and wireless system 200 of FIG. 2, the first acoustic repeater 220 is electrically coupled to the bus 215.

In some examples, the first acoustic repeater 220 includes a power source such as a battery independent of the power provided to the tools 210, 212, 214 of the wireline tool string 208. In other examples, the wireline telemetry cartridge 216 provides electrical power to the tools 210, 212, 214 of the wireline tool string 208 and the first acoustic repeater 220.

In the example system 200, the first acoustic repeater 220 is in communication with one or more acoustic repeaters disposed in the wellbore 206 below the obstruction 218. For example, a second acoustic repeater 222 is disposed below the obstruction 218. Also, one or more end acoustic repeater nodes 224 are also disposed below the obstruction 218 to interface with the tool 219 disposed below the obstruction 218. Thus, the tool 219 is a wireless-enabled tool in that communication can be established with the tool 219 without the use of a wireline cable. The acoustic repeaters 222, 224 can be coupled to production tubing or a conductor string (e.g., a string of metal rods) disposed in the wellbore 206. The example system 200 can include additional or fewer acoustic repeaters 220, 222, 224 than illustrated in FIG. 2.

The acoustic repeaters 220, 222, 224 from a wireless network that provides for communication between the surface and the tool 219 disposed below the obstruction 218. Data is relayed between the surface and the tool 219 via acoustic signals transmitted between the acoustic repeaters 220, 222, 224. In the example system 200, the first acoustic repeater 220 is a master node that communicates with the surface and with the other acoustic repeaters 222, 224. A first propagator 226 and a second propagator 228 are disposed in the wellbore 206 to provide for transmission of acoustic signals between the acoustic repeaters 220, 222, 224. The first and second propagators 226, 228 can include production piping or metal rods coupled to the obstruction 218. In other examples, borehole fluid is used as an acoustic propagation medium.

The example system 200 includes a wireline acquisition front-end ("WAFE") 230 that serves as an interface between a computer 232 at the surface and the tools 210, 212, 214 of the wireline tool string 208 via the cable 204. The WAFE 230 provides for bidirectional communication with and power to the wireline tools 210, 212, 214 via electrical lines 234 of the cable 204. The computer 232 includes software that generates instructions to monitor and control the tools 210, 212, 214 of the wireline tool string 208 (e.g., the tools 210, 212, 214) via the WAFE 230. The electrical lines 234 can be coupled to the bus 215 for transmission of data between the wireline tools 210, 212, 214 and the surface.

In the example system 200, the WAFE 230 also provides for bidirectional communication between the surface computer 232 and the first acoustic repeater 220 and, thus, the tool 219 disposed below the obstruction 218 via the network of the wireless repeaters 220, 222, 224. The software installed on the computer 232 in communication with the WAFE 230 generates instructions to monitor and control the downhole tools disposed below the obstruction 218. Therefore, in the example system 200, the same software platform installed on the computer 232 is used to communicate with the tools 210, 212, 214 of the wireline tool string 208 and the wireless-enabled tool 219 disposed below the obstruction 218.

Thus, as compared to the example system 100 of FIG. 1 in which the WAFE 130 communicates with the tools 110, 112, 114 of the wireline tool string 108 via the first set of electrical lines 134 and the wireline tool bus 115 and the WFE 136 communicates with the first acoustic repeater 120 via the second set of electrical lines 138, in the example system 200 of FIG. 2, the WAFE 230 communicates with the tools 210, 212, 214 of the wireline tool string 208 and the first acoustic repeater 220 via the electrical lines 234 and the bus 215. Also, as compared to the example system 100 of FIG. 1, in which dedicated software platforms are installed on the computer 132 to communicate with the WAFE 130 and the WFE 136, in the example system 200, the same software platform is used to communicate with the tools 210, 212, 214 of the wireline tool string 208 and the wireless-enabled tool 219 (e.g., via the wireless network formed by the repeaters 220, 222, 224). Therefore, in examples where the cable 204 is a monocable and does not provide for splitting of electrical lines between two front-end surface interfaces (e.g., the WAFE 130, 230 and the WFE 136), the first acoustic repeater 220 of FIG. 2 can be managed by the WAFE 230 of FIG. 2.

The electrical lines 234 of the cable 204 provide for communication between the surface computer 232 and the tools 210, 212 and/or the first acoustic repeater 220 via the bus 215 of the wireline tool string 208. As the first acoustic repeater 220 is electrically coupled to the wireline tool bus 215, the first acoustic repeater 220 can be located at substantially any position along the wireline tool string 208 as long as the first acoustic repeater 220 is connected to the bus 215. Thus, as compared to the example positioning of the first acoustic repeater 120 of FIG. 1 in proximity to the surface to substantially simplify wiring along the remainder of the wireline tool string 108, the example system 200 provides for increased flexibility with respect to placement of the first acoustic repeater 220 along the wireline tool string 208.

Figure 3:
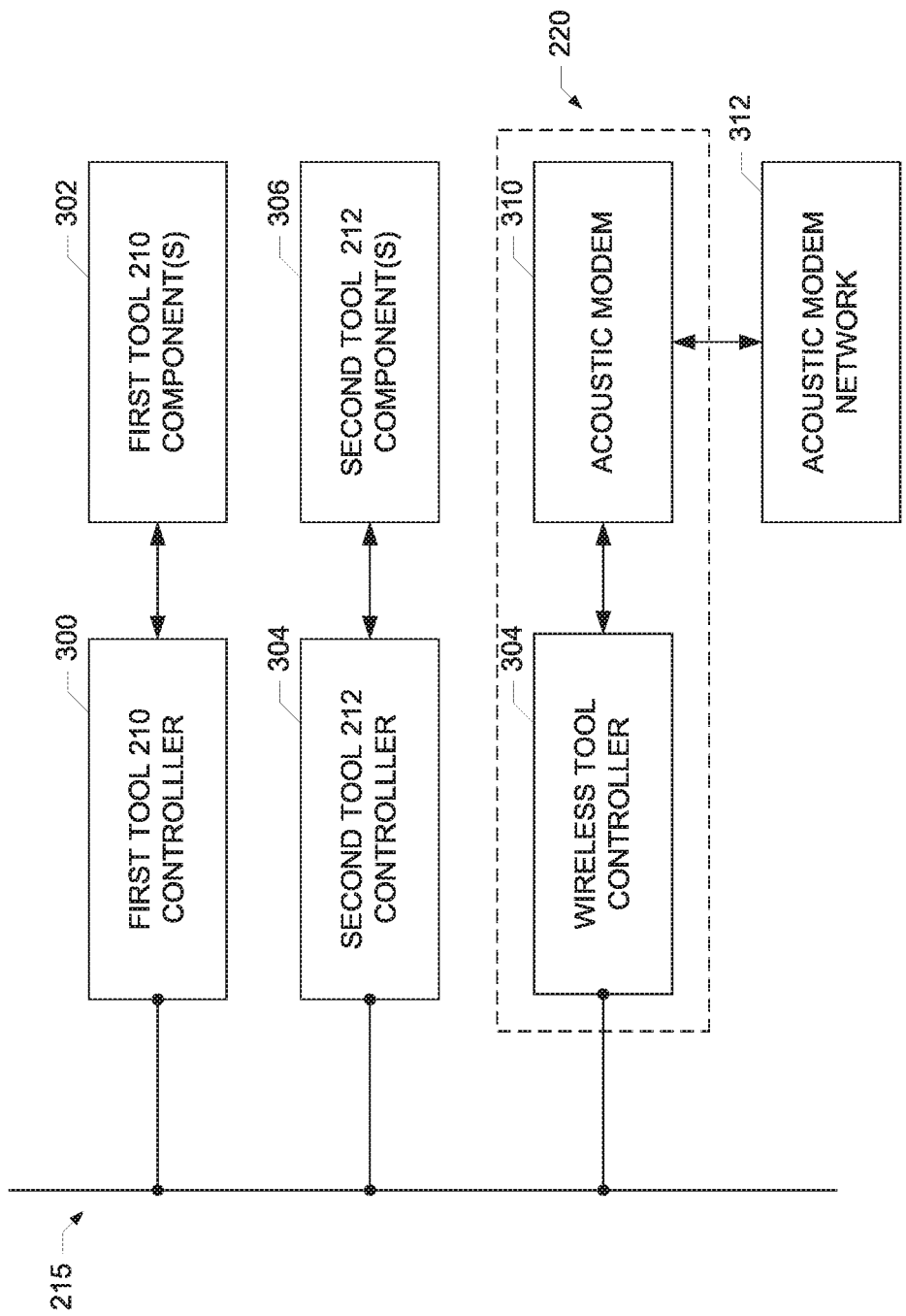
FIG. 3 is a block diagram of an example tool bus for use with the second combined wireline and wireless system of FIG. 2.

FIG. 3 is a block diagram of the example wireline tool bus 215 of the example system 200 of FIG. 2. As illustrated in FIG. 3, a first tool controller 300 of the first tool 210 of the wireline tool string 208 is electrically coupled to the tool bus 215. The first tool controller 300 controls one or more components 302 of the first tool 210, such as sensor(s) and/or actuator(s) of the first tool 210. The first tool controller 300 controls the first tool 210 based on instructions received from the surface via the WAFE 230 and delivered via the electrical lines 234 of the cable 204.

As also illustrated in FIG. 3, a second tool controller 304 of the second tool 212 of the wireline tool string 208 is electrically coupled to the tool bus 215. The second tool controller 304 controls one or more components 306 of the second tool 212, such as sensor(s), actuator(s), etc. based on instructions received from the surface via the WAFE 230 and delivered via the electrical lines 234 of the cable 204.

As disclosed above, in the example system 200, the first acoustic repeater 220 is electrically coupled to the tool bus 215. In the example system 200, the first wireless repeater 220 includes a wireless tool controller 308. The wireless tool controller 308 is communicatively coupled to an acoustic modem 310 of the first wireless repeater 220. The acoustic modem 310 communicates with an acoustic modem network 312 formed by acoustic modems associated with the other repeaters in the wireless network, such as the second acoustic repeater 222.

The wireless tool controller 308 provides for management of the wireless network formed by the repeaters 220, 222, 224 based on the instructions received from the surface via the WAFE 230 and delivered via the cable 204. Also, in some examples, the wireless network requires maintenance such as tuning of carrier frequencies or updating of routing functions. The wireless tool controller 308 of the first wireless repeater 220 maintains the wireless network. Thus, although the first acoustic repeater 220 is integrated in the wireline tool string 208, the first acoustic repeater 220 is able to autonomously manage the wireless network via the wireless tool controller 308.

For example, the wireless tool controller 308 converts commands received via the tool bus 215 into wireless commands that can be relayed from the first acoustic repeater 220 to the other repeaters in the wireless network (e.g., the second wireless repeater 222, the end wireless repeaters 224). The wireless tool controller 308 also organizes and packages data received by the first acoustic repeater 220 for transmission to the surface via the tool bus 215 and the electrical lines 234. The wireless tool controller 308 manages the transmission of messages contained in the acoustic signals across the wireless network by, for example, managing timing of transmission of the signals. The wireless tool controller 308 can also apply priority rules to one or more of the messages as part of managing the transmission of messages across the wireless network via the signals. The wireless tool controller 308 performs maintenance on the wireless network, such as implementing commands to correct network operational errors.

Thus, the wireless tool controller 308 of the first acoustic repeater 220 performs one or more wireless-network based activities for network management and/or maintenance. The coupling of the first acoustic repeater 220 to the tool bus 215 allows for the receipt and delivery of data between the surface, the wireless network, and the tool 219 disposed below the obstruction 218 via the same tool bus that also communicates with the downhole tools 210, 212, 214 of the wireline tool string 208 disposed above the obstruction 218.

FIGS. 4A and 4B illustrate use of an example combined wireline and wireless system 400 to set an example mechanical plug 401 in a wellbore and to monitor wellbore pressure below the plug 401 after the plug 401 is set. The example combined wireline and wireless system 400 can include the first example combined wireline and wireless system 100 of FIG. 1 or the second example combined wireline and wireless system 200 of FIG. 2.

The example system 400 includes a winch 402 disposed at a surface for deploying an electrical cable 404 downhole in a wellbore 406. The cable 404 is coupled to a wireline tool string 408 via a cablehead 409.

The wireline tool string 408 includes a wireline setting tool 410. The wireline setting tool 410 is used to set the plug 401 downhole in the wellbore 406. The wireline tool string 408 can include other tools (e.g., the tools 110, 112, 114, 210, 212, 214 of FIGS. 3 and 4) mechanically and/or electrically coupled to the wireline tool string 408. The wireline tool string 408 also includes a wireline telemetry cartridge 412 to provide for bidirectional communication between the surface, the wireline setting tool 410 and/or other tools of the wireline tool string 408. In some examples, the telemetry cartridge 412 includes an electrical power source for the wireline setting tool 410 and/or other tools of the wireline string 408. The telemetry cartridge 412, wireline setting tool 410, and any other tools of the wireline string 408 are electrically coupled via one or more busses (e.g., the bus 115, 215 of FIGS. 1 and 2).

The wireline tool string 408 of the example system 400 includes a first acoustic repeater 414 integrated or embedded in the wireline tool string 408. The first acoustic repeater 414 is mechanically coupled to the wireline tool string 408 via, for example, a threaded connection. The first acoustic repeater 414 can be coupled to the wireline tool string 408 at positions other than illustrated in FIGS. 4A and 4B.

In the example system 400, before the wireline string 408 is run in hole or disposed in the wellbore 406, a pressure gauge 416 is coupled to the plug 401 such that the pressure gauge 416 is positioned below the plug 401 when the plug 401 is disposed in the wellbore 406 relative to the surface. A second acoustic repeater 418 (e.g., an end acoustic repeater node) is communicatively coupled to the pressure gauge 416. Thus, the pressure gauge 416 is a wireless-enabled pressure gauge in that communication can be established with the pressure gauge 416 without the use of a wireline cable.

The example wireline string 408 can include other wireless-enabled tools disposed below the plug 401 in the wellbore 406. For example, the wireline string 408 of the example system 400 of FIGS. 4A and 4B includes a firing head 420 and one or more tubing-convey perforating (TCP) guns 422 coupled to the wireline string 408 below the plug 401 via tubing 424. A third acoustic repeater 426 (e.g., an end wireless repeater node) is communicatively coupled to the firing head 420 and the TCP gun(s) 422.

The wireline string 408 is coupled to a surface computer 428 via the cable 404. One or more front-end surface interfaces 430 provide for transmission of data between the surface computer 428, the tools of the wireline tool string 408 (e.g., the wireline setting tool 410), and the first acoustic repeater 414. The front-end surface interface 430 can include a WAFE interface (e.g., the WAFE 130, 230 of FIGS. 3 and 4). In some examples, the front-end surface interface 430 includes a WFE interface (e.g., the WFE 136 of FIGS. 3 and 4).

FIG. 4A illustrates the example wireline string 408 being run in hole, or lowered into the wellbore 406 via the cable 404. FIG. 4B illustrates the setting of the plug 401. To set the plug 401, the plug 401 is anchored or coupled to casing or production tubing in the wellbore 406. The plug 401 is set via one or more mechanical operations (e.g., pulling, rotating, etc.) performed by the wireline setting tool 410 based on one or more instructions received from the surface computer 428 via the cable 404. As shown in FIG. 4B, after the plug 401 is set, the plug 401 is coupled to production tubing 432 of the wellbore 406.

The plug 401 of the example system 400 of FIGS. 4A and 4B provides for hydraulic isolation between a portion of the wellbore 406 above the plug 401 and a portion of the wellbore 406 below the plug 401. Thus, plug 401 is an obstruction in the wellbore 406 with respect to communication between the surface and the tools disposed in the wellbore 406 below the plug 401, such as the pressure gauge 416, the firing head 420, and the TCP gun(s) 422. The combined wireline and wireless system 400 of FIGS. 4A and 4B provides for communication between the surface and the tools disposed below the plug 401 in the wellbore 406.

The example system 400 can be used to check the pressure of the wellbore 406 below the plug 401 after the plug 401 is set by the wireline setting tool 410 and while the wireline tool string 408 is disposed in the wellbore 406. As disclosed above, the pressure gauge 416 is enabled for wireless communication via the second acoustic repeater 418. In the example system 400, the first acoustic repeater 414, the second acoustic repeater 418, and the third acoustic repeater 426 form a wireless network. For example, the first acoustic repeater 414 is a master node in communication with the second and third repeaters 418, 426 disposed below the plug 401 and the surface computer 428 (e.g., via the cable 404).

As illustrated in FIGS. 4A and 4B, a first propagator 434 and a second propagator 436 are disposed in the wellbore 406 (e.g., coupled to the plug 401). The first and second propagators 434, 436 are acoustic propagation media to help transmit acoustic signals above and below the plug 401 when the plug 401 is set downhole in the wellbore 406 via the network of the first, second, and third acoustic repeaters 414, 418, 426.

To obtain pressure readings from the pressure gauge 416, pressure readings collected by the pressure gauge 416 are transmitted to the surface via wireless communication between the second acoustic repeater 418 of the pressure gauge 416 and the first or master wireless repeater 414. The first acoustic repeater 414 transmits the data from the pressure gauge 416 to the surface via the electrical lines of the cable 404 (e.g., the electrical lines 134, 138, 234 of FIGS. 1 and 2). The data is received at the surface computer 428 via the cable 404 and the front-end surface interface 430.

In the example system 400, one or more instructions can be transmitted from the surface computer 428 via the cable 404 to increase the pressure in the wellbore 406. After the pressure is increased in the wellbore 406, pressure data collected by the pressure gauge 416 with respect to the pressurized wellbore 406 is wirelessly transmitted between the first and second acoustic repeaters 414, 418. The pressure data for the pressurized wellbore is sent to the surface computer 428 via the cable 404 and the front-end surface interface 430.

The pressure readings collected before the wellbore 406 is pressurized and after the wellbore 406 is pressurized are compared by the surface computer 428 (e.g., by software installed on the surface computer 428) to determine an integrity of the plug 401, for example, in preventing leaks. A pressure differential for the pressure readings collected before and after pressurization of the wellbore 406 is calculated and compared with a predefined threshold value. If the pressure differential satisfies the threshold value, the surface computer 428 can instruct that the portion of the wireline tool string 408 above the plug 401 be unset and removed from the wellbore 406 and returned to the surface. If the pressure differential does not satisfy the threshold value, the plug 401 can be unset and re-set via the wireline setting tool 410. In other examples, the wireline tool string 408 can be removed from the wellbore 406 with the plug 401 coupled thereto to check the condition of the plug 401.

Thus, the example system 400 can be used to can be used to set the plug 401 in the wellbore 406 and determine an integrity of the plug 401 in providing hydraulic isolation via one downhole run of the wireline tool string 408. The transmission of pressure readings collected by the pressure gauge 416 disposed below the plug 401 to the surface computer 428 via the first and second acoustic repeaters 414, 418 provides an efficient means of checking the pressure in the wellbore 406 and the integrity of the plug 401 while the wireline tool string 408 is disposed in the wellbore 406 and available to set or re-set the plug 401.

In some examples, the wireline tool string 408 (e.g., the portion including the wireline setting tool 410 and the first wireless repeater 414) is deployed downhole to unset the plug 401 (e.g., to remove the obstruction provided by the plug 401 that has previously set). In such examples, the wireless network formed between the first and second acoustic repeaters 414, 418 can be used to obtain pressure readings from the pressure gauge 416 to determine if pressure has built up in the wellbore 406 before unsetting the plug 401 via the wireline setting tool 410. In some examples, the example combined wireline and wireless system 400 of FIGS. 4A and 4B is implemented with a wireline milling tool to remove the plug 401 from the wellbore 406.

Also, the first acoustic repeater 414 can be used to communicate with the other tools disposed downhole below the plug 401. For example, the first acoustic repeater 414 can transmit instructions received from the surface computer 428 via the cable 404 to the third acoustic repeater 426 via one or more acoustic signals. The instructions received via the third acoustic repeater 426 can be used to, for example, operate the firing head 420 and/or the TCP gun(s) 422. Thus, the example system 400 can be used to deploy one or more tools downhole, including barrier-forming or obstructing tools such as plugs, and to monitor for wellbore conditions and/or to operate the tools, including the tools disposed below the plug 401, in one run of the wireline tool string 408.

As disclosed above with respect to FIGS. 1-4, the example combined wireline and wireless systems 100, 200, 400 can be used to communicate with one or more tools disposed below an obstruction in a wellbore. In some examples, a wireline tool string includes one or more tools that prevent electrical lines from passing through the tool, such as a motor. However, the wireline tool string can include one or more tools coupled to the string below the tool that prevents the electrical lines from passing therethrough, i.e., the obstructing tool. Thus, the tools coupled to the string below the obstructing tool are unable to communicatively couple to the bus of the tool string. In such examples, the combined wireline and wireless systems 100, 200, 400 disclosed herein can be used to communicate with the tool(s) disposed below the obstructing tool in the wirelines string.

Figure 5:
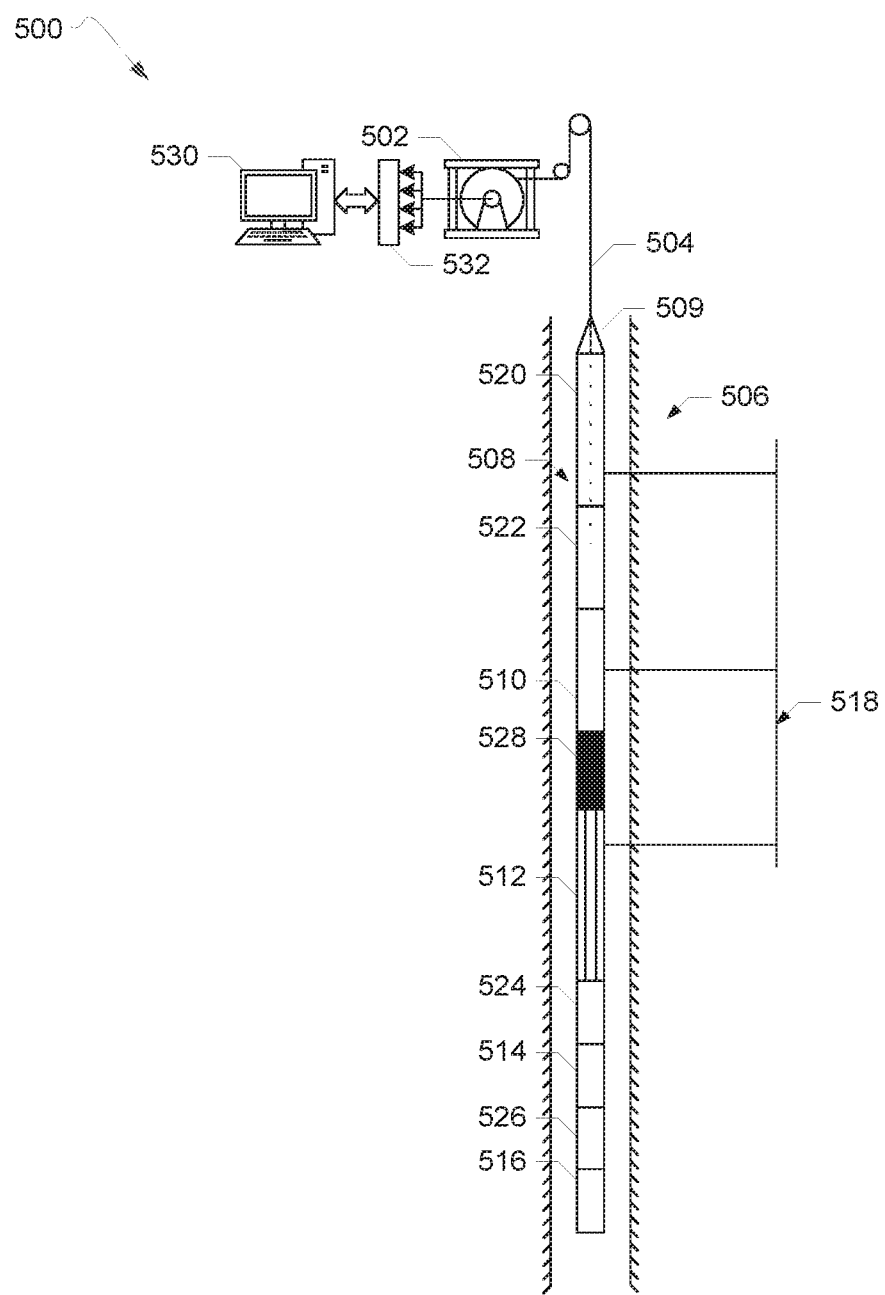
FIG. 5 illustrates a fourth example combined wireline and wireless system in accordance with the teachings disclosed herein.

FIG. 5 illustrates an example combined wireline and wireless system 500 for communicating with one or more tools coupled to a wireline tool string below a tool that does not allow for electrical lines to pass therethrough. The example combined wireline and wireless system 500 can include the first example combined wireline and wireless system 100 of FIG. 1 or the second example combined wireline and wireless system 200 of FIG. 2.

The example system 500 includes a winch 502 disposed at a surface for deploying a cable 504 downhole in a wellbore 506. The cable 504 is coupled to a wireline tool string 508 via a cablehead 509. The cable 504 includes one or more electrical lines.

The wireline tool string 508 of the example system 500 includes a first tool 510, a second tool 512, a third tool 514, and a fourth tool 516. As illustrated in FIG. 5, the third tool 514 and the fourth tool 516 are coupled to the wireline tool string 508 below the second tool 512 relative to the surface when the wireline tool string is disposed in the wellbore 506. The example wireline tool 508 of FIG. 5 can include additional or fewer tools.

In the example system 500, the first tool 510 and the second tool 512 are electrically coupled to a bus 518. The wireline tool string 508 includes a wireline telemetry cartridge 520 to provide bidirectional communication between, for example, the first and second tools 510, 512 of the wireline tool string 508 and the surface via the bus 518 and the cable 504. In some examples, the telemetry cartridge 520 includes an electrical power source for the tools of the wireline string 508.

In the example system 500, the second tool 512 is an obstructing tool that prevents deployment of electrical lines of the cable 504 through the second tool 512. For example, the second tool 512 can be a motor or other tool with moving parts that prevent wiring of electrical lines through the second tool 512. Thus, because the electrical lines of the cable 504 cannot be deployed through the second tool 512, the example third tool 514 and the example fourth tool 516 are unable to communicatively couple to the bus 518.

Although the third and fourth tools 512, 516 of the example system 500 are not able to communicatively couple to the bus 518, the third and fourth tools 512, 516 can be controlled via a wireless network formed from wireless repeaters disposed in the wireline tool string 508. The wireline tool string 508 of the example system 500 includes a first acoustic repeater 522 mechanically coupled to the wireline tool string 508 above the obstructing tool 512 when the wireline tool string 508 is disposed in the wellbore 506. The first acoustic repeater 522 can be coupled to the wireline tool string 508 at other positions than illustrated in FIG. 5. In some examples, the first acoustic repeater 522 is electrically coupled to the bus 518.

In the example system 500, the third tool 512 and the fourth tool 516 are wireless-enabled tools. For example, a second acoustic repeater 524 is communicatively coupled to the third tool 514 and a third acoustic repeater 526 is communicatively coupled to the fourth tool 516. The first acoustic repeater 522, the second acoustic repeater 524, and the third wireless repeater 526 form a wireless network for the transmission of acoustic signals containing messages across the network. The example wireline tool 508 can include acoustic propagation media or a propagator 528 to help transmit acoustic signals between the first, second, and/or third acoustic repeaters 522, 524, 526.

The wireline string 508 is coupled to a surface computer 530 via the cable 504. One or more front-end surface interfaces 532 provides for transmission of data between the surface computer 530, the tools of the wireline tool string 508 (e.g., the first and second tools 510, 512), and the first acoustic repeater 522. The front-end surface interface 532 can include a WAFE interface (e.g., the WAFE 130, 230 of FIGS. 3 and 4). In some examples, the front-end surface interface 532 includes a WFE interface (e.g., the WFE 136 of FIGS. 3 and 4).

In the example system 500, data is exchanged between the surface computer 530 and the first tool 510 and/or the second tool 512 via the cable 504 and the front-end surface interface 532. Also, in the example system 500 of FIG. 5, data is exchanged between the surface computer 530 and the third tool 514 and/or the fourth tool 516 via wireless communication between the first acoustic repeater 522, the second acoustic repeater 524, and/or the third acoustic repeater 526. The first acoustic repeater 522 communicates with the surface computer 530 via the cable 504 and the front-end surface interface 532 to exchange data between the surface computer 530 and the wireless-enabled third and/or fourth tools 514, 516.

Thus, the example system 500 of FIG. 5 provides for substantially real-time control of a plurality of tools of the wireline tool string 508 via a combination of wired and wireless communication between the tools and the surface. The example system 500 provides for increased flexibility in coupling tools to the wireline tool string 508. Although the wireline tool string 508 can include one or more tools that hinder the deployment of electrical lines through the tool(s), communication can be established with the tool(s) disposed below the obstructing tool(s) via a wireless network formed across the wireline tool string 508.

While an example manner of implementing the example combined wireline and wireless systems 100, 200, 400, 500 are illustrated in FIGS. 1-5, one or more of the elements, processes and/or devices illustrated in FIGS. 1-5 may be combined, divided, re-arranged, omitted, eliminated and/or implemented in any other way. Further, the example winch 102, 202, 402, 502; the example cable 104, 204, 404, 504; the example wireline tool string 108, 208, 408, 508; the example tools 110, 112, 114, 119, 210, 212, 214, 219, 410, 416, 420, 422, 510, 512, 514, 516; the example bus 115, 215, 518; the example wireline telemetry cartridge 116, 216, 412, 520; the example obstruction 118, 218, 401; the example acoustic repeaters 120, 122, 124, 220, 222, 224, 414, 418, 426, 522, 524, 526; the example software interface (e.g., WAFE, WFE) 130, 136, 230, 430, 532; the example surface computer 132, 232, 428, 530; the example electrical lines 134, 138, 234; the example first tool controller 300; the example first tool component(s) 302; the example second controller 304; the example second tool component(s) 306; the wireless tool controller 308; the acoustic modem 310; the acoustic modem network 312; and/or, more generally, the example combined wireline and wireless systems 100, 200, 400, 500 of FIGS. 1-5 may be implemented by hardware, software, firmware and/or any combination of hardware, software and/or firmware. Thus, for example, any of the example winch 102, 202, 402, 502; the example cable 104, 204, 404, 504; the example wireline tool string 108, 208, 408, 508; the example tools 110, 112, 114, 119, 210, 212, 214, 219, 410, 416, 420, 422, 510, 512, 514, 516; the example bus 115, 215, 518; the example wireline telemetry cartridge 116, 216, 412, 520; the example obstruction 118, 218, 401; the example acoustic repeaters 120, 122, 124, 220, 222, 224, 414, 418, 426, 522, 524, 526; the example software interface (e.g., WAFE, WFE) 130, 136, 230, 430, 532; the example surface computer 132, 232, 428, 530; the example electrical lines 134, 138, 234; the example first tool controller 300; the example first tool component(s) 302; the example second controller 304; the example second tool component(s) 306; the wireless tool controller 308; the acoustic modem 310; the acoustic modem network 312;

and/or, more generally, the example combined wireline and wireless systems 100, 200, 400, 500 of FIGS. 1-5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, winch 102, 202, 402, 502; the example cable 104, 204, 404, 504; the example wireline tool string 108, 208, 408, 508; the example tools 110, 112, 114, 119, 210, 212, 214, 219, 410, 416, 420, 422, 510, 512, 514, 516; the example bus 115, 215, 518; the example wireline telemetry cartridge 116, 216, 412, 520; the example obstruction 118, 218, 401; the example acoustic repeaters 120, 122, 124, 220, 222, 224, 414, 418, 426, 522, 524, 526; the example software interface (e.g., WAFE, WFE) 130, 136, 230, 430, 532; the example surface computer 132, 232, 428, 530; the example electrical lines 134, 138, 234; the example first tool controller 300; the example first tool component(s) 302; the example second controller 304; the example second tool component(s) 306; the wireless tool controller 308; the acoustic modem 310; the acoustic modem network 312; and/or, more generally, the example combined wireline and wireless systems 100, 200, 400, 500 of FIGS. 1-5 is/are hereby expressly defined to include a tangible computer readable storage device or storage disk such as a memory, a digital versatile disk (DVD), a compact disk (CD), a Blu-ray disk, etc. storing the software and/or firmware. Further still, the example combined wireline and wireless systems 100, 200, 400, 500 of FIGS. 1-5 may include one or more elements, processes and/or devices in addition to, or instead of, those illustrated in FIGS. 1-5, and/or may include more than one of any or all of the illustrated elements, processes and devices.

Figure 6:
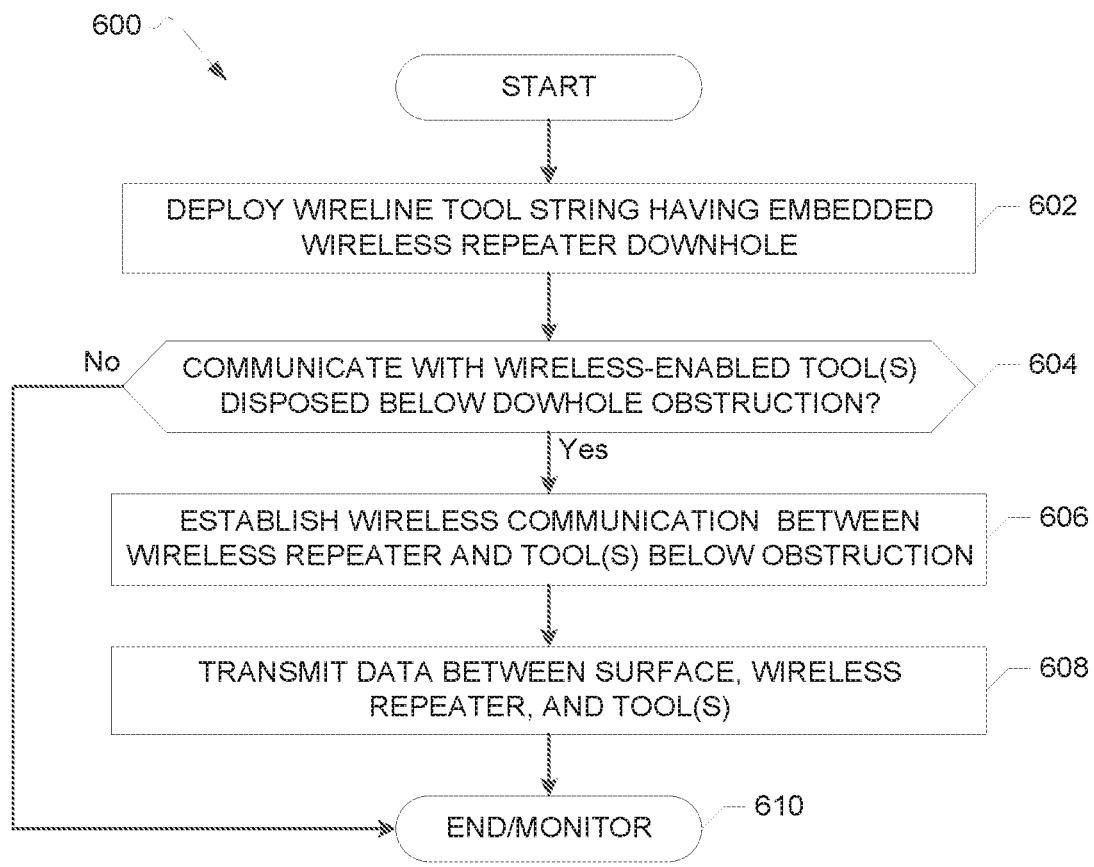
FIG. 6 is a flow diagram of an example method that may be executed to implement the example systems of FIGS. 3, 4, 6A, 6B, and 7.

FIG. 6 illustrates a flowchart representative of an example method 600 that can be implemented to communicate with a wireless-enabled tool disposed below an obstruction in a wellbore. The wireless-enabled tool can be, for example, any of the tools 119, 219, 420, 422, 514, 516 of the example systems 100, 200, 400, 500 of FIGS. 1-5. The obstruction can be, for example, a mechanical obstruction (e.g., a plug, a valve) or a deviation in the wellbore that prevents deployment of a wireline tool string below the obstruction. In other examples, the obstruction is a tool such as a motor coupled to a wireline tool string that also includes the wireless-enabled tool, where obstructing tool prevents electrical lines from passing therethrough. The obstruction can be any of the obstructions 118, 218, 401, 512 of FIGS. 1-5. Although the example method 600 is disclosed below in connection with communication in a wellbore, the example method 600 can be implemented in other examples in which wired communication between a device (e.g., an electro-mechanical device) and a controlling device (e.g., a computer) is obstructed.

The example method 600 begins with deploying a wireline tool string (e.g., the wireline tool string 108, 208, 408, 508 of FIGS. 1-5) downhole in a wellbore (e.g., the wellbore 106, 206, 406, 506) (block 602). The wireline tool string can be deployed downhole from the surface via a cable including electrical lines (e.g., the cable 104, 204, 404, 504; the electrical lines 134, 136, 234). In the example method 600, the wireline tool string deployed downhole includes a wireless repeater embedded or integrated therein (e.g., the acoustic repeater 120, 220, 414, 522). The wireless repeater can be embedded in the wireline tool string by mechanically coupling the wireless repeater to the wireline tool string. The wireless repeater can be an acoustic repeater.

The example method 600 includes a decision of whether to communicate with one or more wireless-enabled tools disposed in the wellbore below a downhole obstruction (block 604). In some examples, the one or more wireless-enabled tools (e.g., actuators, sensors) are disposed downhole in the wellbore such that the tools are disposed below the obstruction (e.g., a pressure barrier, a wellbore deviation, a tool that prevents wiring therethrough) relative to the surface. In some examples, the obstruction is set downhole by the wireline tool string that is deployed downhole (e.g., block 602).

Because of the obstruction, wired communication between the tool(s) disposed below the obstruction and a surface computer (e.g., the surface computer 132, 232, 428, 530) via the wireline tool string cannot be established. For example, the tool(s) disposed below the obstruction may not be able to communicatively couple to a bus (e.g., the bus 115, 215, 518) of the wireline tool string for communication with the surface via the cable. In the example method 800 of FIG. 8, the tool(s) disposed below the obstruction are communicatively coupled to one or more wireless repeaters (e.g., the acoustic repeaters 122, 124, 222, 224, 418, 426, 524, 526) and, thus, are enabled for wireless communication (e.g., via acoustic telemetry).

A decision to communicate with the tool(s) disposed below the obstruction may be made to, for example, obtain readings collected by sensor(s) with respect to conditions below the obstruction (e.g., the pressure gauge 416 of FIG. 4). In other examples, a decision is make to communicate with the tool(s) disposed below the obstruction to instruct the tool(s) to perform one or more operations (e.g., the firing head 420, the TCP gun(s) 422). If a decision is made to communicate with the one or more tool(s) disposed below the downhole obstruction, the example method 600 continues with establishing wireless communication between the wireless repeater embedded in the wireline tool string and the wireless-enabled tool(s) (block 606).

In the example method 600, wireless communication can be established between the wireless repeater embedded in the wireline tool string and the wireless repeater(s) associated with the tool(s) disposed below the obstruction. For example, the wireless repeater embedded in the wireline tool string and the wireless repeater(s) of the tool(s) disposed below the obstruction form an acoustic telemetry network for the transmission of acoustic signals containing messages across the network. Thus, the example method 600 provides for communication between the tool(s) disposed below the obstruction and a portion of the wireline tool string disposed above the obstruction (e.g., relative to the surface).

The example method 600 includes transmitting data between the surface, the wireless repeater embedded in the wireline tool string, and the tool(s) disposed below the obstruction (block 608). For example, data received from the tool(s) disposed below the obstruction by the wireless repeater embedded in the wireline tool string can be transmitted to the surface via the electrical line(s) of the wireline tool string cable. In some examples, the wireless repeater embedded in the wireline tool string is coupled to the bus of the wireline tool string (e.g., the bus 215 of FIG. 2). In such examples, data can be exchanged between the surface computer and the embedded wireline repeater via a wireline acquisition front-end ("WAFE") (e.g., the WAFE 130, 230). The WAFE can also communicate with one or more other tools of the wireline tool string disposed above the obstruction (e.g., the tool(s) electrically coupled to the wireline tool bus). In other examples, data is transmitted between the wireless repeater embedded in the wireline tool string and the surface computer via electrical line(s) separate from the electrical line(s) that provide for communication between the surface and the tools of the wireline tool string disposed above the obstruction. In such examples, a wireless acquisition front-end ("WFE") (e.g., the WFE 136 of FIG. 1) provides a front-end surface interface for communication between the surface computer and the embedded wireless repeater separate from the WAFE. The example method 600 ends with continued monitoring of the tool(s) disposed downhole including, in some examples, the tool(s) disposed below the obstruction (block 610).

The flowchart of FIG. 6 is representative of an example method that may be used to implement the example systems 100, 200, 400, 500 of FIGS. 1-5. In this example, the method may be implemented using machine-readable instructions that comprise a program for execution by a processor such as the processor 712 shown in the example processor platform 700, discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example systems 100, 200, 400, 500 may alternatively be used. For example, the order of execution of the blocks may be changed, and/or some of the blocks described may be changed, eliminated, or combined.

As mentioned above, the example processes of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
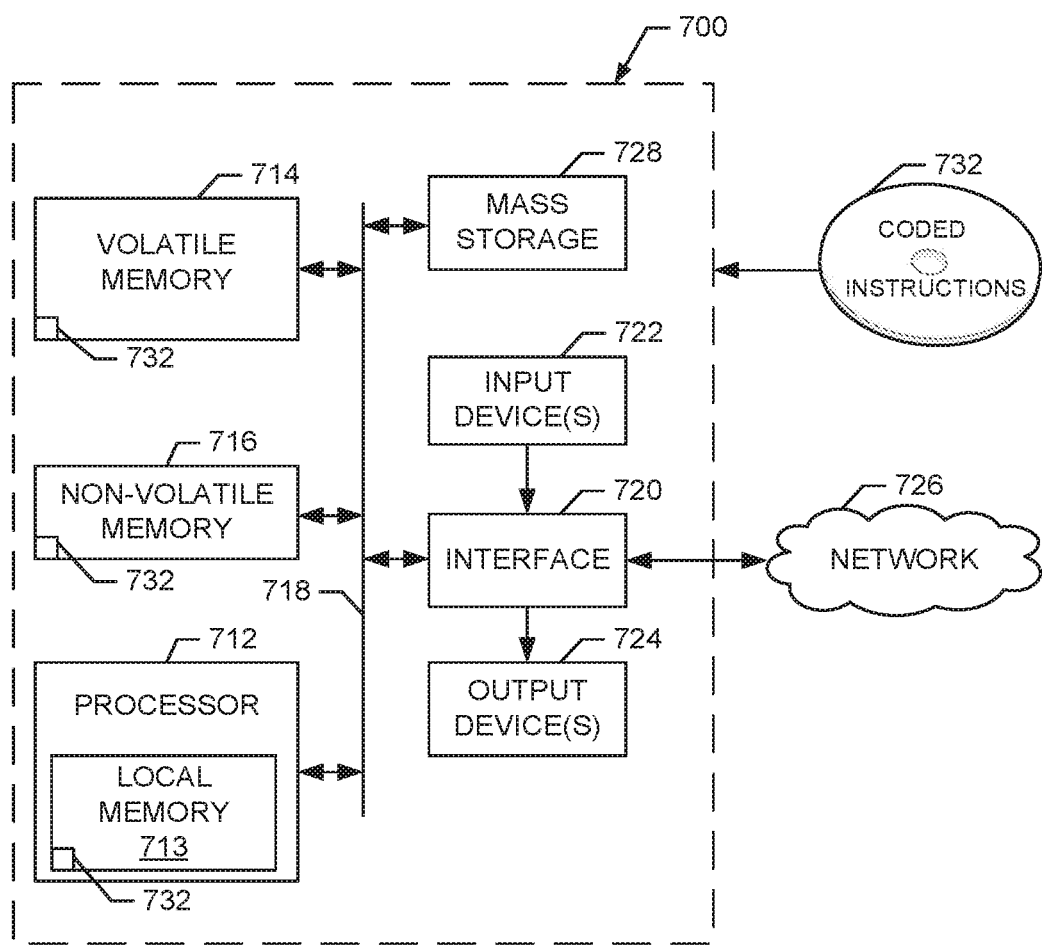
FIG. 7 is a diagram of a processor platform that may be used to carry out the example method of FIG. 6 and/or, more generally, to implement the example systems of FIGS. 1, 2, 4A, 4B, and 5.

FIG. 7 is a block diagram of an example processor platform 700 capable of executing instructions to implement the method of FIG. 6 and the example systems 100, 200, 400, 500 of FIGS. 1-5. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 of FIG. 7 may be stored in the mass storage device 728, in the volatile memory 714, in the non-volatile memory 716, and/or on a removable tangible computer readable storage medium such as a CD or DVD.

From the foregoing, it will be appreciated that the above disclosed apparatus, systems, and methods provide for communication between the surface and one or more tools disposed downhole that are not in wired communication with the surface due to one or more obstructions. Examples disclosed herein establish wireless communication between a wireless repeater embedded in a wireline tool string and wireless repeater(s) associated with the obstructed tool(s). The wireless repeater embedded in the wireline tool string exchanges data with the surface, thereby providing for communication between the surface and the obstructed tool(s). Thus, examples disclosed herein provide for communication with downhole tool(s) that are not able to communicate with the surface via electrical cable. Disclosed examples extend the communicative capabilities of the wireline tool string beyond, for example, a depth of an end of the wireline tool string in a wellbore to tools that are not communicatively coupled to the wireline tool string. Further, the examples disclosed herein can be used to efficiently set a tool (e.g., a plug) via the wireline tool string and monitor the conditions below the tool set by the wireline tool string via the wireless network in one downhole run of the wireline tool string. Thus, the examples disclosed herein can be used to conduct downhole operations through a combination of wired and wireless communication with the surface.

An example apparatus includes a tool string including a tool bus and a first acoustic repeater mechanically coupled to the tool string. The first acoustic repeater is to communicate with a second acoustic repeater to exchange data. The second acoustic repeater is communicatively coupled to a first tool. The first tool is not communicatively coupled to the tool bus.

In some examples, the first tool is disposed below an obstruction relative to a surface when the tool string is disposed in a wellbore.

In some examples, the obstruction is a second tool of the tool string. In some examples, the apparatus includes a propagation medium coupled to the obstruction. In such examples, the propagation medium is to relay the data between the first acoustic repeater and the second acoustic repeater.

In some examples, the first acoustic repeater is communicatively coupled to the tool bus.

In some examples, the first acoustic repeater includes a controller. In such examples, the controller is coupled to the tool bus.

In some examples, the first tool is coupled to the tool string via a threaded connection.

In some examples, the apparatus includes a cable coupled to the tool string. In such examples, the cable includes a first set of electrical lines. In some examples, the first acoustic repeater is to transmit the data to a surface computer via the first set of electrical lines. In some such examples, the cable includes a second set of electrical lines and the tool string includes a second tool. In such examples, the tool bus is to transmit data between the second tool and the surface computer via the second set of electrical lines.

In some examples, the first tool is mechanically coupled to a third acoustic repeater. In such examples, the first acoustic repeater is to communicate with the first tool via the second acoustic repeater and third acoustic repeater.

An example method includes deploying, by executing an instruction with a processor, a tool string in a wellbore. The tool string including a first acoustic repeater. The example method includes communicating, by executing an instruction with the processor and via the first acoustic repeater, with a second acoustic repeater. The second acoustic repeater is associated with a first tool disposed in the wellbore. The second acoustic repeater is to transmit first data to the first acoustic repeater. The example method includes transmitting, by executing an instruction with the processor, the first data from the first acoustic repeater to the processor.

In some examples, the method includes setting a second tool in the wellbore via the tool string. The first tool is to be disposed below the second tool in the wellbore when the second tool is set in the wellbore. The example method includes analyzing the first data one of unsetting the tool string from the second tool or adjusting a setting of the second tool via the tool string based on the analysis. In some such examples, the first tool is a pressure gauge and the second tool is a pressure barrier. In some such examples, the first data includes pressure data collected by the pressure gauge. In some such examples, the method further includes monitoring the pressure data while an area of the wellbore above the pressure barrier relative to a surface is pressurized. In some such examples, the method further includes detecting an increase in a pressure in an area below the pressure barrier relative to the surface based on the pressure data when the area above the pressure barrier is pressurized.

In some examples, the tool string includes a second tool and the method includes transmitting the first data to the processor via a first front-end surface interface. The example method includes transmitting second data from the second tool to the processor via a second front-end surface interface.

In some examples, the method includes transmitting third data from the processor to the first acoustic repeater via the first front-end surface interface. In such examples, the first acoustic repeater is to transmit the third data to the first tool via the second acoustic repeater. In some such examples, the method includes transmitting fourth data from the processor to the second tool via the second front-end surface interface. In such examples, the transmitting of the fourth data via the second front-end surface interface is to occur at substantially the same time as the transmitting of the third data via the first front-end surface interface.

In some examples, the method further includes transmitting the first data from the first acoustic repeater to the processor via a tool bus of the tool string.

An example apparatus includes a tool string including a first tool. The example apparatus includes a first acoustic repeater mechanically coupled to the tool string. The first acoustic repeater is to exchange first data with a second acoustic repeater. The second acoustic repeater is associated with a second tool. The example apparatus includes means for transmitting the first data between the first acoustic repeater and a processor and means for transmitting second data between the first tool and the processor.

In some examples, the apparatus includes a tool bus. In such examples, the means for transmitting the first data and the means for transmitting the second data are communicatively coupled to the tool bus.

In some examples, the apparatus includes a cable coupled to the tool string. In such examples, the means for transmitting the first data includes a first set of electrical lines of the cable and the means for transmitting the second data includes a second set of electrical lines of the cable. In some such examples, the apparatus includes a first front-end interface communicatively coupled to the first set of electrical lines and a second front-end interface communicatively coupled to the second set of electrical lines. In some other examples, the tool string further includes a third tool. The third tool is to prevent the second set of electrical lines of the cable from electrically coupling to the second tool.

An example method includes disposing a pressure gauge in a wellbore. The pressure gauge is to be coupled to a first acoustic repeater. The example method includes setting a pressure barrier in the wellbore via a tool string. The pressure gauge is to be disposed below the pressure barrier relative to a surface. The tool string includes a second acoustic repeater mechanically coupled to the tool string. The example method includes accessing, by executing an instruction with a processor and via the second acoustic repeater, first pressure data collected by the pressure gauge. The first pressure data is to be transmitted to the second acoustic repeater via the first acoustic repeater. The example method includes increasing, by executing an instruction with the processor, a pressure in wellbore. The example method includes accessing, by executing an instruction with the processor and via the second acoustic repeater, second pressure data collected by the pressure gauge after the increasing of the pressure in the wellbore. The example method includes performing, by executing an instruction with the processor, a comparison of the first pressure data and the second pressure data. The example method includes one of unsetting the tool string from the pressure barrier or adjusting the setting of the pressure barrier via the tool string based on the comparison.

In some examples, the method includes comparing a pressure differential between the first pressure data and the second pressure data to a threshold pressure differential. In such examples, the one of the unsetting the tool string from the pressure barrier or adjusting the setting of the pressure barrier is based on the threshold pressure differential.

In some examples, the method includes unsetting the pressure barrier from the wellbore and monitoring the pressure in the wellbore below pressure barrier during the unsetting based on third pressure data collected by the pressure gauge. The third pressure data is to be accessed via the second acoustic repeater.

In the specification and appended claims: the terms "connect," "connection," "connected," "connecting," and/or other variations thereof are used to mean "in direct connection with" or "in connection with via one or more elements;" and the term "set" and/or variations thereof is used to mean "one element" or "more than one element." Further, the terms "couple," "coupling," "coupled," and "coupled to" and/or other variation thereof are used to mean "directly coupled together" or "coupled together via one or more elements." As used herein, the terms "down," "lower," "above," "below," and other variations thereof and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A system comprising:
a wireline tool string including a tool bus; and
a first acoustic repeater mechanically coupled to the tool string, the first acoustic repeater to communicate with a second acoustic repeater to exchange data, the second acoustic repeater communicatively coupled to a first tool disposed below an mechanical obstruction relative to a surface when the tool string is disposed in a wellbore, the first tool is not communicatively coupled to the tool bus, and the mechanical obstruction prevents electrical communication between the tool bus and the first tool, and
a downhole cable coupled to the tool string for deploying the tool_string in the wellbore, the cable including a first set of electrical lines, the first acoustic repeater to transmit the data to a surface computer via the first set of electrical lines.

2. The system of claim 1, wherein the obstruction is a second tool of the tool string.

3. The system of claim 1, further including a propagation medium coupled to the obstruction, the propagation medium to relay the data between the first acoustic repeater and the second acoustic repeater.

4. The system of claim 3, wherein the propagation medium includes a first and second propagators movable in the wellbore along with the mechanical obstruction.

5. The system of claim 1, wherein the first acoustic repeater is communicatively coupled to the tool bus.

6. The system of claim 5, wherein the first acoustic repeater includes a controller, the controller coupled to the tool bus.

7. The system of claim 1, wherein the first tool is coupled to the tool string via a threaded connection.

8. The system of claim 1, wherein the cable includes a second set of electrical lines and the tool string includes a second tool, the tool bus to transmit data between the second tool and the surface computer via the second set of electrical lines.

9. The apparatus of claim 1, wherein the first tool is mechanically coupled to a third acoustic repeater, the first acoustic repeater to communicate with the first tool via the second acoustic repeater and third acoustic repeater.

10. The system of claim 1, wherein the first tool comprises a pressure gauge.

11. The system of claim 1, wherein the mechanical obstruction prevents deployment of the wireline tool string below the obstruction.

12. The system of claim 1, wherein the first tool is mechanically coupled to the mechanical obstruction.

13. A method comprising:
deploying a wireline tool string in a wellbore using a cable having a set of electrical lines coupled to the wireline tool string, the wireline tool string including a first acoustic repeater and a tool bus;
by executing instructions with a processor:
setting a mechanical obstruction in the wellbore via the wireline tool string, wherein the mechanical obstruction prevents deployment of the wireline tool string below the mechanical obstruction;

communicating first data from the first acoustic repeater to a second acoustic repeater, the second acoustic repeater not communicatively coupled with the tool bus and communicatively coupled with a first tool disposed in the wellbore below a mechanical obstruction relative to a surface when the wireline tool string is disposed in the wellbore, the second acoustic repeater to transmit second data to the first acoustic repeater; and transmitting the second data from the first acoustic repeater to the processor via the set of electrical lines of the cable.

14. The method of claim 13,
wherein the mechanical obstruction is a pressure barrier and wherein the method further includes:
analyzing the second data; and
one of unsetting the wireline tool string from the second tool pressure barrier or adjusting a setting of the second tool pressure barrier via the wireline tool string based on the analysis.

15. The method of claim 14, wherein the first tool is a pressure gauge.

16. The method of claim 13, wherein the wireline tool string includes a second tool, and
wherein the method further includes:
transmitting the second data to the processor via a first front-end surface interface; and
transmitting third data from the second tool to the processor via a second frontend surface interface.

17. The method of claim 16, further including transmitting fourth data from the processor to the first acoustic repeater via the first front-end surface interface, the first acoustic repeater to transmit the fourth data to the first tool via the second acoustic repeater.

18. The method of claim 17, further including transmitting fifth data from the processor to the second tool via the second front-end surface interface, the transmitting of the fifth data via the second front-end surface interface to occur at substantially the same time as the transmitting of the fourth data via the first front-end surface interface.

19. The method of claim 13, further including transmitting the second data from the first acoustic repeater to the processor via the tool bus of the tool string.

20. A method comprising:
disposing a pressure gauge in a wellbore using a wireline tool string deployed via a cable in a wellbore, the pressure gauge to be coupled to a first acoustic repeater;
setting a pressure barrier in the wellbore via the wireline tool string, the pressure gauge to be disposed below the pressure barrier relative to a surface, the tool string including a second acoustic repeater mechanically coupled to the tool string;
accessing, by executing an instruction with a processor and via the second acoustic repeater, first pressure data collected by the pressure gauge, the first pressure data to be transmitted to the second acoustic repeater via the first acoustic repeater;
increasing, by executing an instruction with the processor, a pressure in wellbore;
accessing, by executing an instruction with the processor and via the second acoustic repeater, second pressure data collected by the pressure gauge after the increasing of the pressure in the wellbore;
performing, by executing an instruction with the processor, a comparison of the first pressure data and the second pressure data; and
one of unsetting the wireline tool string from the pressure barrier or adjusting the setting of the pressure barrier via the wireline tool string based on the comparison.

21. The method of claim 20, further including comparing a pressure differential between the first pressure data and the second pressure data to a threshold pressure differential, the one of the unsetting the tool string from the pressure barrier or adjusting the setting of the pressure barrier based on the threshold pressure differential.

22. The method of claim 20, further including:
unsetting the pressure barrier from the wellbore; and
monitoring the pressure in the wellbore below pressure barrier during the unsetting based on third pressure data collected by the pressure gauge, the third pressure data to be accessed via the second acoustic repeater.

* * * * *